United States Patent [19]
Mayer et al.

[11] Patent Number: 5,741,606
[45] Date of Patent: Apr. 21, 1998

[54] OVERCHARGE PROTECTION BATTERY VENT

[75] Inventors: Steven T. Mayer, San Leandro; John C. Whitehead, Davis, both of Calif.

[73] Assignee: Polystor Corporation, Dublin, Calif.

[21] Appl. No.: 509,531

[22] Filed: Jul. 31, 1995

[51] Int. Cl.⁶ ................................................ H01M 2/12
[52] U.S. Cl. .................... 429/53; 429/54; 429/56; 429/57; 429/61
[58] Field of Search ................ 429/57, 53, 54, 429/56, 58, 60, 61

[56] References Cited

U.S. PATENT DOCUMENTS

| | | | |
|---|---|---|---|
| 3,278,334 | 10/1966 | Urry | 429/60 |
| 4,025,696 | 5/1977 | Tucholski | 426/61 |
| 4,028,478 | 6/1977 | Tucholski | 429/61 |
| 4,129,686 | 12/1978 | Kaduboski | 429/61 |
| 4,307,158 | 12/1981 | Thibault | 429/56 |
| 4,943,497 | 7/1990 | Oishi et al. | 429/53 |
| 4,971,867 | 11/1990 | Watanabe et al. | 429/61 |
| 4,992,344 | 2/1991 | Coppers | 429/61 |
| 5,026,615 | 6/1991 | Tucholski | 429/58 |
| 5,171,648 | 12/1992 | Beard | 429/61 |
| 5,418,082 | 5/1995 | Taki et al. | 429/53 |
| 5,427,875 | 6/1995 | Yamamoto et al. | 429/223 |
| 5,464,705 | 11/1995 | Wainwright | 429/61 |

FOREIGN PATENT DOCUMENTS 1-294372  11/1989  Japan.

OTHER PUBLICATIONS

Sony Corporation IG by 650 millimeter B Cell, Apr. 1995.

*Primary Examiner*—Stephen Kalafut
*Assistant Examiner*—Carol Chaney
*Attorney, Agent, or Firm*—Hickman Beyer & Weaver LLP

[57] ABSTRACT

A cell pressure control system is disclosed which has a two stage control mechanism. In the first stage, increased cell pressure causes a conductive deflection member to bend to a position where it opens an electrical contact and places the cell in open circuit. This prevents current from flowing through the cell and thereby possibly slowing or preventing further increases in cell pressure. The electrical contact relies only upon the pressure of two members (one of which is the deflection member) pushing against one another. If the cell's internal pressure continues to increase even after the pressure contact is broken, the second stage of the pressure control mechanism is activated. Specifically, a pressure rupturable region in the above-mentioned deflection member ruptures to relieve the cell's internal pressure. The pressure rupturable region is a circularity scored region on the conductive deflection member.

27 Claims, 6 Drawing Sheets

OVERCHARGE PROTECTION BATTERY VENT

BACKGROUND OF THE INVENTION

The present invention relates to cell containers for use in electrochemical energy storage devices. More particularly, the invention relates to cell caps having pressure release mechanisms that place the cell in open circuit by opening a pressure contact when the cell internal pressure reaches a defined level.

Due to the increasing demand for portable electronic equipment, there is a corresponding demand for rechargeable cells having high specific energies. In order to meet this demand, various types of rechargeable cells have been developed including improved nickel-cadmium aqueous batteries, various formulations of aqueous nickel metal hydride batteries, and, most recently, nonaqueous rechargeable lithium metal and lithium intercalation cells.

Of particular interest in the context of the present invention are rechargeable lithium-ion cells which utilize liquid electrolytes. Because of the large amounts of energy stored in these cells and because of the potentially hazardous nature of some cell components (most notably the electrolyte solvent and salts), there is a risk of explosion or uncontrolled release of cell electrolyte.

Typically, lithium-ion cells operate at pressures in the range of 25–75 psi. Such pressures are normally produced by gases generated during the cell's formation cycle and operation. Higher pressures, however, can result from overcharge due to a faulty charger, external or internal cell shorting, exposure to excessive heat (e.g., a fire), etc. Thus, lithium-ion cell housings should also include some mechanism for controlling the build-up of excess internal pressure. Simply installing a vent in the cell will serve this function by automatically discharging cell contents as internal pressures approach dangerous levels. However, such contents, including flammable organic electrolyte solvents and potentially hazardous electrolyte salts (e.g., lithium-hexafluorophosphate), should not be released from the cell under pressure unless absolutely necessary.

Thus, some cells have been designed with safety mechanisms to limit further increases in cell pressure before venting becomes necessary. One representative mechanism is provided in a cell cap 14, shown in FIGS. 1A and 1B, of the 18 by 650 millimeter B cell manufactured by Sony Corporation of Japan. As shown, the top of that cell cap includes a terminal contact 1 for connecting the cell to external circuitry. Of particular relevance here, terminal contact 1 includes vent holes 10, which allow the cell fluid to vent should the pressure in the cell interior become very high. The terminal contact 1 is supported against a positive temperature coefficient resistor ("PTCR") 9 which is, in turn, supported against a nipple shaped conductive flexible member 4, with scoring 6. The whole assembly (terminal contact, PTCR, and the conductive flexible member) is held together in electrical contact by a first plastic insert 3 and a metal outer jacket 8 as shown. A crimp in the outer jacket 8 gives it a "C" shape which holds the first plastic insert 3 in position against the terminal contact 1 and the conductive flexible member 4.

Figure 1A:
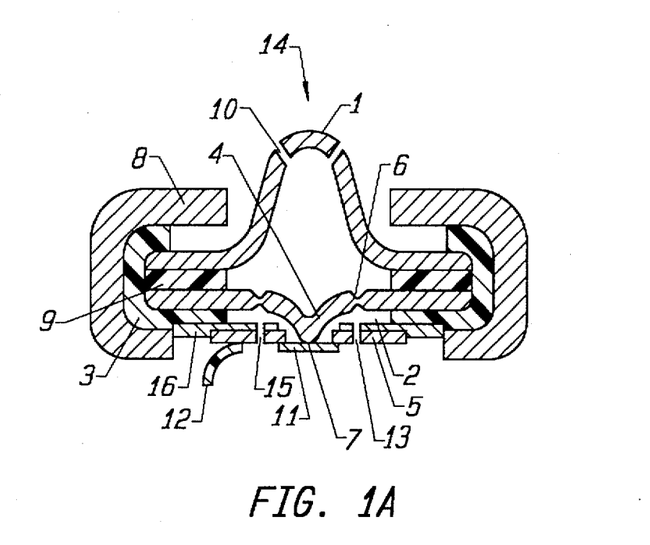
FIG. 1A is a cross-sectional diagram showing a side cross-sectional view of a cell cap subassembly of a prior art cell.
Figure 1B:
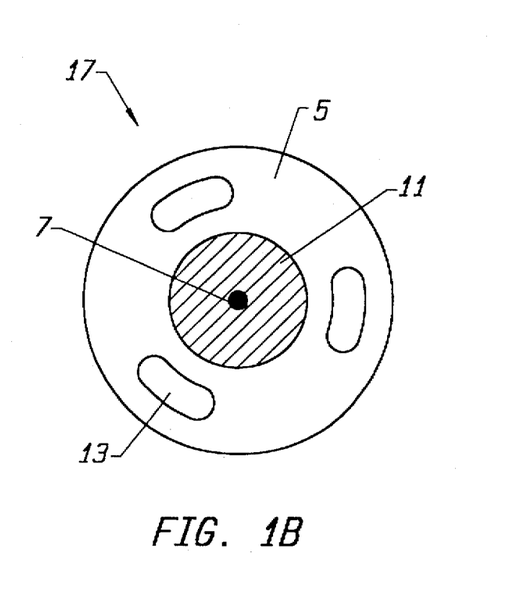
FIG. 1B is a cross-sectional diagram showing the top of the a component of the subassembly shown in FIG. 1A.

The nipple portion of conductive flexible member 4 is affixed to a metallic foil 11—which ranges in thickness from about 1–2 mils—by an ultrasonic weld 7. Foil 11 is, in turn, welded onto an aluminum disk 5, about 20 µm thick. As shown in FIG. 1B, the disk 5 includes a central opening, which is covered by foil 11, and three peripheral holes 13 which provide access to the cell interior. Further, peripheral holes 13 are aligned with passages 15 in a second plastic insert 16 so as to provide a fluid pathway from the cell interior to a pressure cavity 2. The second plastic insert 15 electrically insulates the aluminum disk 5 from the metal outer jacket 8, and it is held in place between the aluminum disk 5 and the first plastic insert 3 by the weld 7. Finally, a conductive tab 12 is welded to the bottom of the disk 5 to provide a conductive pathway from the cell cathode to the cell cap subassembly.

During normal operation, current flows from the cathode through tab 12, to disk 5 and foil 11, and then through ultrasonic weld 7 to the assembly of flexible member 4, PTCR 9, and terminal contact 1, and finally out to an external circuit. The first plastic insert 3 and the second plastic insert 16 confine the current flow through this defined conductive pathway.

If the cell current reaches unusually high levels, the PTCR 9 becomes resistive in response to the high applied current and thereby reduces the current flow. This is because the material used in the PTCR typically is a mixture of polymer and carbon. When the current density through the PTCR increases to a defined level, the polymer temperature passes a melting transition point and becomes resistive. If the current density drops back below the defined level, the polymer again becomes glassy and the PTCR again becomes conductive. In general, this mechanism prevents cell internal heating and dangerous pressure build-up resulting from inadvertent shorting. However, if the problem is unrelated to excessive current flow or if the PTCR fails or can not adequately control the current flow, other safety mechanisms are activated.

First, as pressure builds up within the cell, that pressure is transmitted to the pressure cavity 2 where it forces flexible member 4 upward. When the pressure buildup reaches a predefined level, the foil 11 tears at ultrasonic weld 7, thus breaking the conductive pathway to the terminal contact and putting the cell into open circuit. At that point, the cell is electrically isolated from external sources, and no further electrochemical reactions will occur within the cell that could cause the pressure build-up to continue. Although this renders at cell useless as an energy source, the severed electronic pathway hopefully prevents any dangerous consequences resulting from an uncontrolled discharge of cell fluids.

In the event of further excessive pressure build-up due to, for example, extreme temperatures outside the cell, the scoring 6 on the conductive flexible member will rupture to allow venting of cell contents (usually electrolyte) through vent holes 10, thereby preventing an explosion.

While the above design provides some measure of safety, it has certain drawbacks. First, it employs a complicated collection of components which must be assembled by tedious manufacturing steps, including an ultrasonic welding step. Second, it goes into open circuit only when the foil 11/ultrasonic weld 7 breaks. Unfortunately, the exact pressure at which the cell goes into open circuit depends upon the strength an ultrasonic weld—which may be hard to control. Thus, in some cases, it may be possible that the vent design will not perform as intended because the ultrasonic weld 7 resists breaking until the cell pressure is high enough to rupture the scoring 6. Under such circumstances, cell fluids would be expelled before the first safety mechanism could place the cell into open circuit. If, on the other hand, the weld 7 is too weak, the connection 7 will have low strength under pressure, resulting in a premature open circuit. Thus, the quality of weld 7 must meet exacting standards.

In view of the above, it is apparent that lithium-ion cell technology requires an improved pressure control system that provides appropriate safety features to prevent uncontrolled discharge of cell fluids, and also employs a simple, easy to manufacture design.

SUMMARY OF THE INVENTION

The present invention provides improved cell pressure control systems having a two stage control mechanism. In the first stage, increased cell pressure causes a conductive deflection member to deflect to a position where it opens an electrical contact and places the cell in open circuit. This prevents current from flowing through the cell and thereby possibly slowing or preventing further increases in cell pressure. An important advantage of this invention is that the electrical connection is through a pressure contact. That is, the contact relies only upon the compressive pressure of two conductive members pushing against one another (as opposed to the fluid pressure discussed elsewhere herein). Unlike the above-described mechanism, it does not rely on a weld which can be difficult to form with the precise strength required to function as a pressure sensitive contact.

If the cell's internal pressure continues to increase even after the pressure contact is opened, the second stage of the pressure control mechanism is activated. Specifically, a pressure rupturable region in the above-mentioned deflection member will rupture and relieve the cell's internal pressure. Typically, the pressure rupturable region will be a region of reduced material thickness in the conductive deflection member. More preferably, the pressure rupturable region will be a scored region, and most preferably it will be a circularly scored region.

In a first aspect, the present invention provides a cell cap subassembly for controlling pressure build-up in a cell. The cell cap subassembly can be characterized as including the following features: (1) a terminal contact for making electrical contact with an external circuit; (2) a conductive deflection member in electrical contact with the terminal contact; and (3) a conductive pathway making a pressure contact with the conductive deflection member. The conductive pathway provides at least a portion of a pathway for electrons flowing between the pressure contact and an electrode. In order to reach the terminal contact and external circuitry, current must flow through the pressure contact. However, if the cell pressure builds to a first defined pressure, then the deflection member deflects such that the pressure contact is opened and current can no longer flow from the electrode to terminal contact. As noted, the deflection member typically includes a pressure rupturable region which ruptures on a second defined pressure (which is greater than the first defined pressure).

In a preferred embodiment, the deflection member is a "flip-burst disk" having a substantially dome shaped flip portion and a rim portion, which is connected to and located outside of the flip portion. The rim portion makes an electrical contact with the terminal contact, and the flip portion makes a pressure (electrical) contact with the conductive pathway. The flip portion has a normal position and an inverted position, depending on the pressure within the cell. In its normal position, the flip portion protrudes away from the terminal contact and makes the pressure contact to an electrical pathway to an electrode in the cell. In its inverted position, however, it protrudes toward the terminal contact and does not make contact with the electrical pathway. When the flip portion is exposed to a first defined pressure in the cell, it inverts or collapses upward because the dome-shaped flip portion is designed to be an unstable compressively loaded structure. This upward collapse of the flip portion opens the pressure contact with the conductive pathway.

In an alternative embodiment, the cell cap subassembly includes a resilient member which is disposed between the terminal contact and the deflection member such that the resilient member, in a normal position, allows the deflection member to make the pressure contact with the conductive pathway. However, when the resilient member is subjected to an unusually high cell internal pressure (at least the first defined pressure), the resilient member compresses such that the contact between the deflection member and the conductive pathway is opened. In preferred versions of this embodiment, the resilient member is a spring, but it may also be a rubber member or other elastomeric member.

The cell cap subassembly may further include a positive temperature coefficient resistor (PTCR) for electrically connecting the terminal contact to the deflection member. As noted, PTCRs provide some measure of protection against excessively high cell currents by becoming very resistive at current densities greater than a predefined level. The cell cap subassembly may further include a subassembly jacket and an insulating insert which together maintain the terminal contact, the positive temperature coefficient resistor, and the deflection member in electrical contact.

In a second aspect, the present invention provides a method for controlling pressure build-up in a cell. The method can be characterized as including the following steps: (1) providing a cell having a cell interior and a cell cap subassembly having a flip-burst disk which, as noted, includes a flip portion capable of inverting at a first defined pressure; and (2) inverting the flip portion when exposed to the first defined pressure in the cell, whereby a pressure contact is opened between a cell electrode and a cell terminal contact. If the pressure continues rising to a second defined pressure, the flip burst disk ruptures at a pressure rupturable region, which after rupturing provides a fluid pathway from the cell interior to the cell exterior.

In a third aspect, the present invention provides a lithium ion cell which can be characterized as including the following elements: (1) a cell cap subassembly as describe above; (2) an anode, including a specified anode material, which is capable of intercalating lithium during charge and deintercalating lithium during discharge; (3) a cathode, including a specified cathode material, which is capable of taking up lithium on discharge and releasing lithium on charge; and (4) an electrolyte conductive to lithium ions. Preferably, the cathode material includes a mixture of two or more homogeneous lithium ion insertion materials (e.g., $LiCoO_2$ and $LiNiO_2$ or $LiCoO_2$ and $LiMn_2O_4$), and the anode includes a mixture of two or more homogeneous lithium intercalation materials (e.g., homogeneous graphitic carbon particles and homogeneous non-graphitic carbon particles).

The electrolyte may be one or more of the following solvents: propylene carbonate, ethylene carbonate, 1,2-dimethoxyethane, 1,2-diethoxyethane, γ-butyrolactone, tetrahydrofuran, 2-methyltetrahydrofuran, 1,3-dioxolan, 4-methyl 1,3-dioxolan, diethyl ether, sulfolane, acetonitrile, propionitrile, glutaronitrile, dimethyl carbonate, diethyl carbonate, anisole, methyl propionate, ethyl propionate, methyl acetate, normal-propyl acetate, iso-propyl acetate, normal-butyl acetate, ethyl methyl carbonate, and mixtures thereof. The electrolyte may further include one or more of the following salts: $LiN(CF_3SO_2)_2$, $LiAsF_6$, $LiPF_6$, $LiBF_4$, $LiB(C_6H_5)_4$, LiCl, LiBr, $CH_3SO_3Li$, and $CF_3SO_3Li$. In particularly preferred embodiments, the electrolyte is a mixture of ethylene carbonate and dimethyl carbonate and dissolved $LiN(CF_3SO_2)_2$ at about 0.5 to 1.2M and dissolved $LiAsF_6$ or $LiPF_6$ at about 0.1 to 0.4M. The total concentration of $Li(CF_3SO_2)_2N$ and $LiAsF_6$ or $LiPF_6$ should not exceed the solubility limit of lithium in the solvent.

These and other features of the present invention will be presented in more detail in the following specification of the invention and in the associated figures.

DESCRIPTION OF THE PREFERRED EMBODIMENTS

The present invention provides apparatus and methods for relieving cell pressure build-up before it reaches dangerous levels. The invention accomplishes this by opening a "pressure contact" at moderately high pressures, thereby putting the cell into open circuit. As used herein, a pressure contact, refers to an electrical contact between two conductive members which relies only upon pressure between the two members to maintain the contact. When the pressure is removed or overcome by a countervailing fluid pressure in the opposite direction, the electrical contact is opened. A pressure contact should be distinguished from a contact that relies upon other means for holding two conductive members together. For example, contacts that rely upon welds, conductive binders, etc. are not considered pressure contacts within the meaning of this invention.

1. Flip-Burst Disk Cell Cap Subassembly Embodiment

Figure 2A:
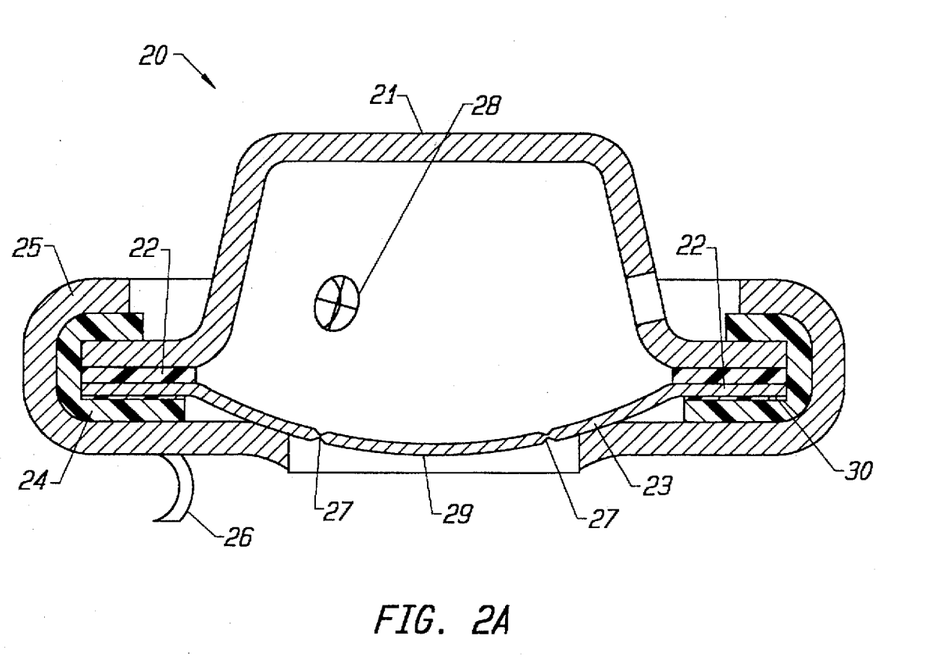
FIG. 2A is a cross-sectional diagram showing a side cross-sectional view of a cell cap subassembly of a flip-burst disk embodiment of the present invention.
Figure 3:
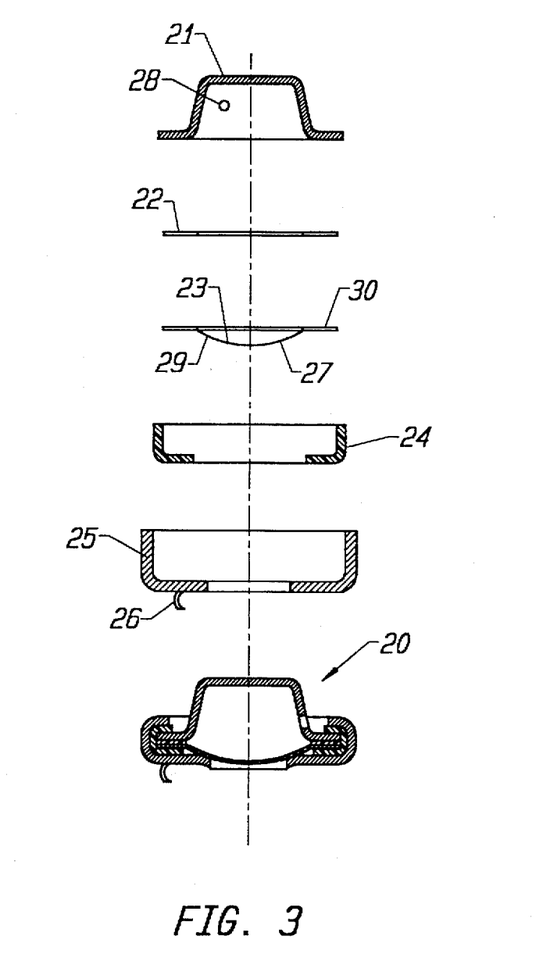
FIG. 3 is a cross-sectional diagram showing an exploded view of the cell cap subassembly of FIG. 2A.

Referring first to FIGS. 2A and 3, a preferred cell cap subassembly 20 of the invention is shown in cross-section. For convenience, this design will be referred to herein as a "flip-burst disk" embodiment. A terminal contact 21 having vent holes 28 is provided at the top of the flip-burst disk cell cap subassembly 20. If the internal cell pressure becomes very high, fluid from within the cell will vent through holes 28. The terminal contact 21 is supported against a PTCR 22, which is, in turn, supported against a flip-burst disk 23. The flip-burst disk 23 has two main components: (1) a substantially dome shaped flip portion 29 and (2) a rim portion 30, against which the PTCR 22 is supported. The flip portion 29 makes a pressure contact with a conductive subassembly jacket 25, and includes scoring 27, which will rupture at very high pressures. The assembly of terminal contact 21, PTCR 22, and the flip-burst disk 23 is held together by a insulating insert 24, and this is further encased in the subassembly jacket 25 which is typically metallic. As shown, the subassembly jacket 25 is crimped to define a "C" shape which holds the insulating insert 24 in engagement with terminal contact 21, PTCR 22, and rim portion 30 of flip-burst disk 23. Finally, a conductive tab 26, is welded to the bottom of the subassembly jacket 25, and provides a conductive pathway from the cell cathode to the cell cap subassembly.

Figure 2B:
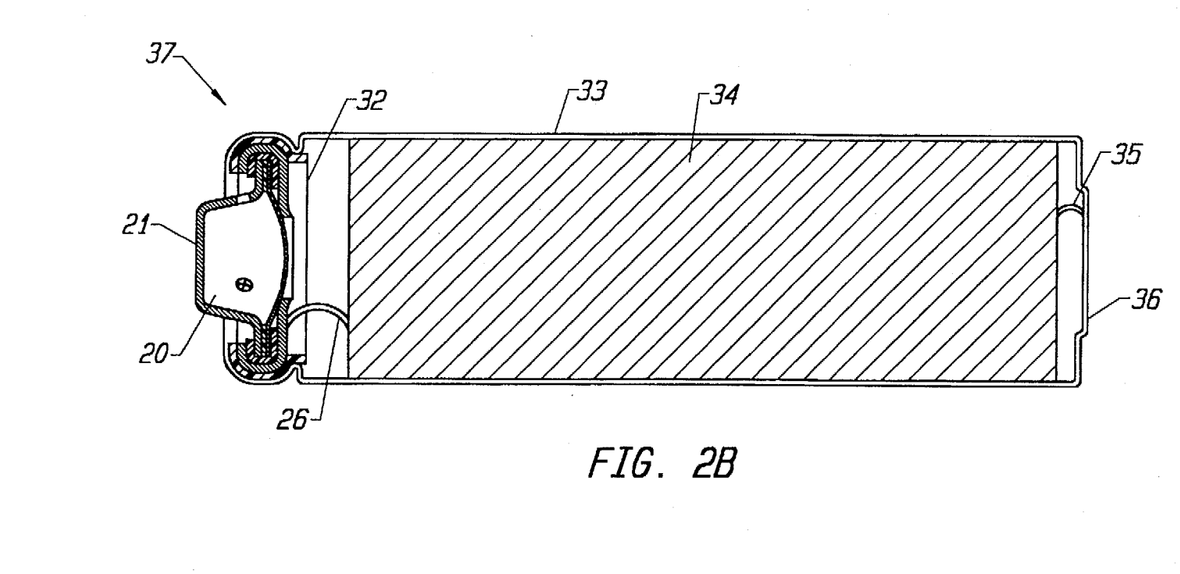
FIG. 2B is a cross-sectional diagram showing a side cross-sectional view of an entire cell having the cell cap subassembly shown in FIG. 2A

FIG. 2B shows how cell cap subassembly 20 can be arranged in a lithium ion cell 37. Externally, the cell 37 includes a positive terminal 21, a negative terminal 36, and a cell can 33. As shown, the flip-burst disk cell cap subassembly 20 (as described above), is provided at the top of a cell can 33, and is electrically connected to the cathode part of an electrode "jellyroll" 34, by conductive tab 26. As is known to those of skill in the art, a jellyroll design employs a thin anode sheet and a thin cathode sheet wound together in a spiral. Electrode jellyroll 34 is provided within cell can 33, and is separated from cell cap subassembly 20 by an insulator 32. In addition, the anode part of electrode jellyroll 34 is electrically connected to a negative terminal 36 by a negative terminal tab 35.

During normal operation, a conductive path is provided between the cell's negative terminal 36, the negative terminal tab 35, electrode jellyroll 34 (via ionic conduction), conductive tab 26, and the flip-burst disk cell cap subassembly 20 (including positive terminal 21). Within cell cap subassembly 20, the current enters the subassembly jacket 25, flows across the pressure contact point between the flip portion of the flip-burst disk 23, and subassembly jacket 25, through the flip-burst disk 23, the PTCR 22, and out to external circuitry through the terminal contact 21. The plastic insulator 24 helps confines the current flow through the above defined conductive pathway.

As explained above, if the cell current reaches a defined high level, the PTCR 9, becomes very resistive and thereby reduces the current through the cell. In some instances, this may reduce the risk of dangerous pressure build-up. However, if the problem is unrelated to excessive current flow or if the PTCR fails or cannot adequately control the current flow, other protective mechanisms must be activated.

Figure 4A:
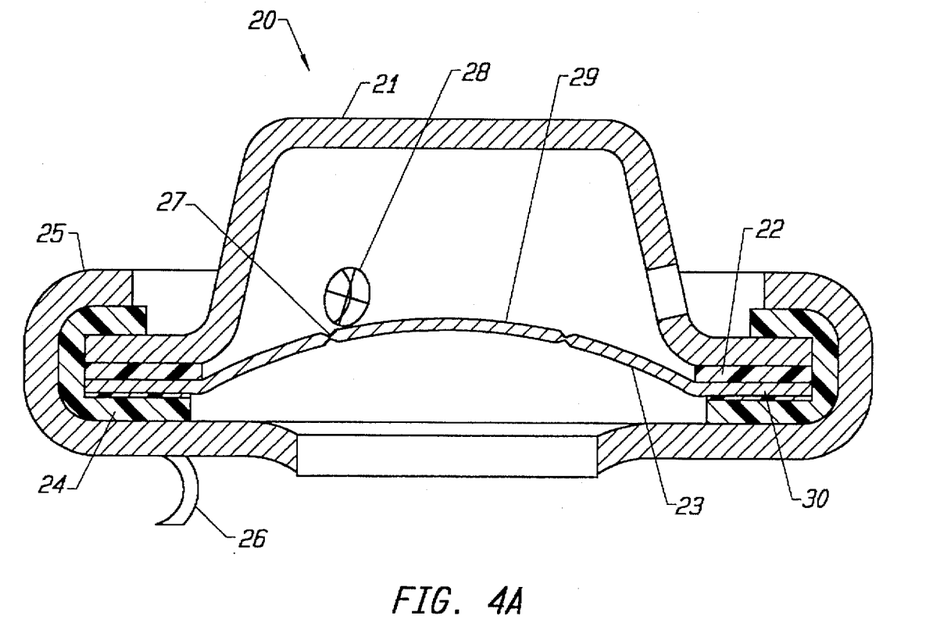
FIG. 4A is a cross-sectional diagram showing a side cross-sectional view of the FIG. 2A cell cap subassembly with a flip portion inverted after being exposed to a first elevated cell pressure.
Figure 4B:
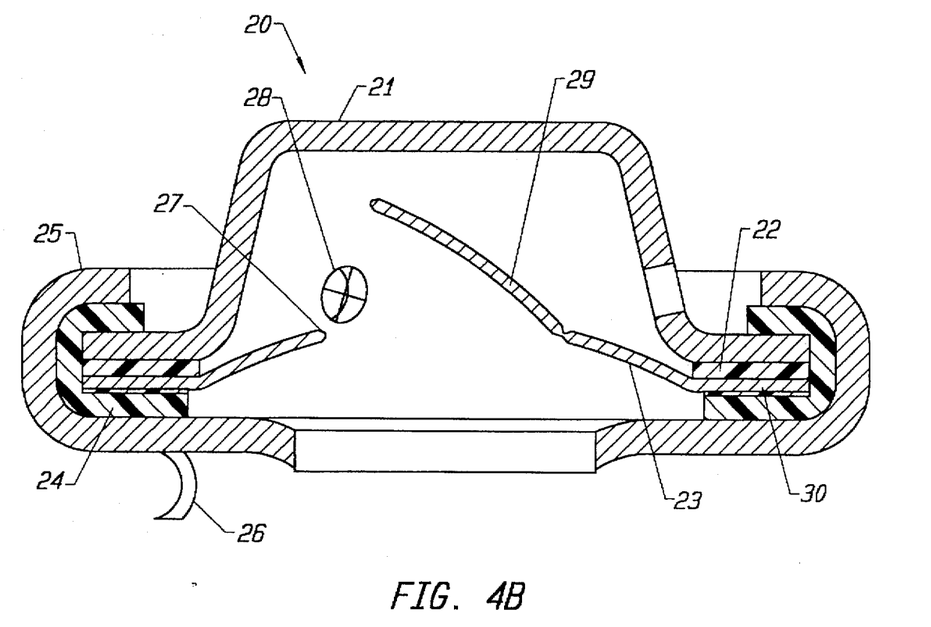
FIG. 4B is a cross-sectional diagram showing a side cross-sectional view of the FIG. 2A cell cap subassembly with a flip portion inverted and ruptured after being exposed to a second elevated cell pressure.

FIGS. 4A and 4B illustrate two levels of protection provided by the flip-burst disk cell cap subassembly 20. During normal cell operation, the dome shaped flip portion 29 of the flip-burst disk 23 protrudes away from the terminal contact 21, and maintains a pressure contact with the conductive pathway leading to the cell electrode (e.g., subassembly jacket 25) as previously explained with reference to FIG. 2A. The plastic insulator 24, which holds the flip-burst disk 23, PTCR 22, and terminal contact 21, confines the current flow through a conductive pathway which includes this pressure contact.

When the pressure build-up in the cell equals a first defined pressure (which results in a critical buckling load on the compressively-loaded flip portion), the flip portion inverts or collapses upward as shown in FIG. 4A so that it protrudes towards the terminal contact 21, and thereby opens the physical contact with subassembly jacket 25. As a result, the cell goes into open circuit, and electrochemical reactions within the cell cease. Inversion of the flip portion 29 may therefore eliminate the cause of the pressure build-up and prevent an uncontrolled discharge of cell contents.

In some cases, however, the cell pressure may continue to build even after the cell goes into open circuit. This may be the case when, for example, the cell is placed in a fire. Under such circumstances, the cell provides for a controlled release of its contents (usually electrolyte) to avoid explosion. This is accomplished as shown in FIG. 4B, such that when the pressure within the cell equals a second defined pressure, which is greater than the first defined pressure, the flip portion 29 ruptures along scoring 27. This allows pressurized cell fluids to controllably vent through a vent hole 28.

The above-described flip-burst disk cell cap design provides certain advantages over the prior art. First, the entire assembly 20 requires relatively few components. For example, the subassembly 20 does not require a complicated multi-part conductive pathway such as the metallic disk 5 and foil 11 combination of the prior art shown in FIG. 1. Further subassembly 20 requires only a single insulating insert, in contrast to the prior art which employs a first plastic insert 3 and a second plastic insert 15.

Second, the flip-burst disk cell cap subassembly 20 is easier to assemble than the prior art systems. Obviously, by employing fewer components, the present invention simplifies assembly. However, the present invention also simplifies assembly by requiring fewer welding steps. As discussed above, the prior art requires multiple welding steps, including an ultrasonic welding step.

Third, the pressure contact of the present invention is more reliable than the weld contact of the prior art. Thus, the pressure relief mechanism of the present invention better ensures that the cell's safety features perform as intended.

Turning again to the construction of subassembly 20, the terminal contact 21 may be made from any conductive material which is stable at the cell potentials to which it is exposed. In a preferred embodiment, it is made from steel, and more preferably nickel plated steel. The PTCR 22 may be made from any material that acts as a fuse. Preferably, the material acts as a resetable fuse, i.e., a material that temporarily increases the cell's resistance when the cell current exceeds a critical level. In a specific embodiment, the PTCR 22 is made from a polymer and carbon mixture. One suitable material is provided under the brand name "POLYSWITCH" available from Raychem Corporation of Menlo Park, Calif.

Most generally, the flip-burst disk 23 can be constructed from a conductive material which (1) resists corrosion at cell potentials to which it is exposed, and (2) has mechanical properties allowing the dome portion to invert at a first defined pressure. Preferably, the flip-burst disk is made from aluminum having a thickness of (for at least the flip portion 29) between about 50 to 250 µm, more preferably between about 100 and 200 µm, and most preferably about 125 µm. At such thickness, the flip-portion will invert somewhere in the range of 150–200 psi, i.e., the first defined pressure. In one preferred embodiment, the flip-portion has a radius of about 8 millimeters.

As noted, the flip portion 29 of the flip-burst disk 23 preferably has scoring 27, which provides a pressure rupturable region capable of rupturing under a second defined pressure. Scoring 27 may be formed by stamping flip portion 27 so as to provide a thin "scored" region of reduced thickness. The scoring can be of various shapes, such as circular, star-shaped, linear, etc. Preferably, the scoring provides a pressure rupturable region which ruptures at cell pressures of between about 350 and 400 psi, and more preferably between about 360 and 380. Of course, the actual rupturing pressure will depend upon the cell design, but in all events it should be chosen to be below the pressure at which it the cell would explode.

In alternative embodiments, the pressure rupturable region is not defined by scoring. For example, the pressure rupturable may be a relatively wide region that is generally thinner or weaker than the surrounding regions of the flip-burst disk.

Insulating insert 24 may be made from any insulating material having sufficient structural integrity to hold together the terminal contact 21, PTCR 22, and flip-burst disk 23 as shown in FIG. 2A. Preferred insulating materials include polypropylene and polyethylene. The subassembly jacket 25 may be made from any conductive material which is stable at the operating potentials in the cell. Like the flip-burst disk, jacket 25 is preferably made from aluminum. Preferably, a base lip of the subassembly jackets 25 is oriented in subassembly 20 such that it tangentially contacts the dome-shaped flip portion of the flip-burst disk 23 to form the pressure contact.

2. Resilient Member Cell Cap Subassembly Embodiment

Figure 5A:
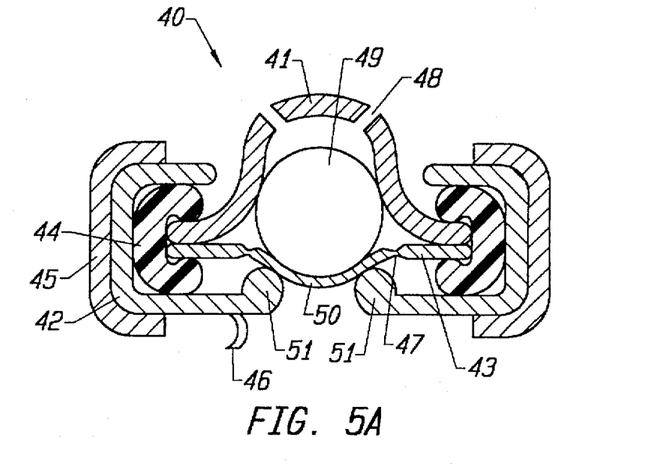
FIG. 5A is a cross-sectional diagram showing a side cross-sectional view of an alternative embodiment of a pressure controlling cell cap subassembly in accordance with this invention.
Figure 5B:
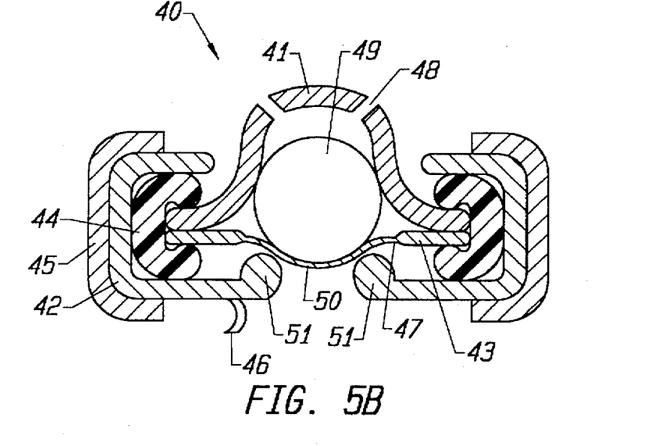
FIG. 5B is a cross-sectional diagram showing a side cross-sectional view of the embodiment subassembly of FIG. 5A upon exposure to a pressure sufficient to break a contact and create an open circuit inside the cell.
Figure 5C:
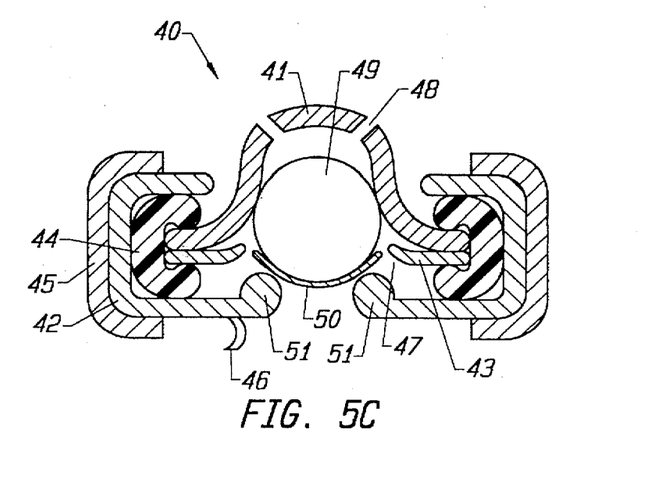
FIG. 5C is a cross-sectional diagram showing the side cross-sectional view of the embodiment subassembly of FIG. 5A upon exposure to a pressure sufficient to rupture a rupturable region on a burst disk.

An alternative embodiment of the present invention is illustrated in FIGS. 5A through 5C. As shown, a terminal contact 41, for connecting the cell to external circuitry, is provided at the top of the cell cap subassembly 40. Like the terminal contact in the above-described embodiment, terminal contact 41 has vent holes 48, which allow the cell fluid to vent in the event of an excessive pressure build-up. The terminal contact 41 is supported against a burst disk 43 with scoring 47, which provides a pressure rupturable region 50. A resilient member 49 is disposed between the terminal contact 41 and the burst disk 43 such that the resilient member 49 pushes the burst disk 43 out towards a contacting element 42. The assembly of terminal contact 41, the burst disk 43, and the resilient member 49, are held in place by an insulating member 44. The member 44, in turn, is surrounded by the contacting element 42. The contacting element 42 makes physical contact with the burst disk 43, at the bottom ends 51, which appear oval shaped and protruding towards the burst disk 43. A conductive tab 46 is welded to the bottom of the contacting element 42 and provides a conductive pathway from the cell cathode to the cell cap subassembly. An insulating outer sealing member 45 houses the entire resilient member cell cap subassembly 40 such the subassembly can be provided in lithium-ion cell can as illustrated in FIG. 3.

During normal operation, current from the cell's cathode travels to the conductive tab 26, flows through the contacting element 42, across the pressure contact point between the contacting element 42, and the burst disk 43, then successively through the burst disk 43, terminal contact 41, and finally out to external circuitry. The member 44 insulates this conductive pathway.

FIG. 5b illustrates the protection afforded by resilient member cell cap subassembly 40 in the event of excessive pressure build-up inside the cell. When the excessive pressure build-up inside the cell equals a first defined pressure (e.g., somewhere in the range of 75–100 psi), the resilient member 49, resting on the burst disk 43, is pushed toward the terminal contact 41, thereby placing the resilient member 49 under increased compression. This opens the physical contact with the contacting element 42, and puts the cell into open circuit, thereby stopping further electrochemical reactions within the cell.

FIG. 5C illustrates additional protection afforded by cell cap subassembly 40 in the event of continuing excessive cell pressure build-up. When the excessive pressure build-up inside the cell equals a second defined pressure (e.g., in the range of 150 to 200 psi), the burst disk 43 ruptures at scoring 47, allowing pressurized cell fluids to flow through the opening created by the severed scoring 47, around the resilient member 49, and out through vent hole 48 provided on the terminal contact 41. While this effectively destroys the cell, it does allow some pressure relief so as to prevent explosion.

3. Cells Utilizing Pressure Contact Subassemblies

After the cell cap subassembly has been prepared, it is assembled in a lithium intercalation cell. Typically, the cell will include (1) a cell container (including the cell cap subassembly), (2) a composite cathode prepared as described above, (3) an intercalation anode capable of reversibly taking up lithium on charge and releasing lithium on discharge, (4) an electrolyte conductive to lithium ions, and (5) a separator between the anode and cathode.

Aside from the cell cap subassembly of this invention, conventional cell containers may be used to fabricate cells from the composite cathodes of this invention. Those of skill in the art will recognize the required properties of a cell container. It should be sized to compactly hold the various cell components and should be made of materials that are impervious to and chemically resistant to the other cell components at operating cell potentials.

The material used as the intercalation cell anode should exhibit high capacity, good reversibility of lithium insertion, and a high average discharge voltage so as to achieve the largest possible energy of the cell. In addition, the material should exhibit a relatively low formation capacity. Such materials include, by way of example, graphitic carbons, non-graphitic carbons, and mixtures of graphitic and non-graphitic carbons. The latter are particularly preferred anodes for use with this invention. They are described in some detail in U.S. patent application Ser. No. 08/386,062, entitled "NONAQUEOUS ELECTROLYTE SECONDARY BATTERY" and filed on Feb. 7, 1995, naming S. Mayer as inventor. That application is incorporated herein by reference for all purposes. Briefly, such composite anodes include mixtures of homogeneous graphitic carbon particles, homogeneous non-graphitic carbon particles, and binders as necessary. Such electrodes can be formulated to have high capacities, low electrode potentials, and other desirable properties of graphite, and, at the same time, have discharge profiles in which the electrode potential varies significantly with the degree of intercalation. Thus, lithium ion cells employing such anodes will perform well at high rates of discharge.

Preferred intercalation anodes include at least about 25 mass percent homogeneous graphitic carbon particles, more preferably at least about 50 mass percent homogeneous graphitic carbon particles, and most preferably about 75 mass percent homogeneous graphitic carbon particles. Of course, the optimal ratios may vary quite a bit depending upon the carbon constituents of the mixture and the desired properties of the electrode. It is generally desirable that the mixture result in electrodes having a potential which varies significantly with state of charge (state of deintercalation). Preferably, the mixture should be chosen such that the resulting electrode has an open circuit potential of that varies by at least about 0.25 volts from a fully charged state in which the electrode is fully intercalated to a state of charge at about 90% deintercalation. For comparison, a pure graphite intercalation electrode generally varies by only about 180 mV during discharge.

The graphite used in this invention is a high purity natural graphite or a synthetic graphite having a high degree of anisotropic morphological structure similar to natural graphite and very good compressibility and electrical conductivity. Suitable graphite includes, for example, SFG synthetic Graphites from Lonza Inc. of Fairlawn, N.J., Graphite KS (a round shaped particle) from Lonza, Graphite T (having a flake-shaped particle with higher surface area) also from Lonza, and grade B6-35 or 9035 from Superior Graphite Co. of Chicago, Ill. Non-graphitic carbons of widely ranging properties may be employed in this invention. In general, the non-graphitic carbons should provide intercalation electrodes having sloping deintercalation profiles. The intercalation electrodes should also have a reasonably high capacity and a reasonably low voltage.

The material used as the intercalation cell cathode should exhibit high capacity, good reversibility of lithium insertion, and a high average discharge voltage so as to achieve the largest possible energy of the cell. Such materials include, by way of example, lithium molybdenum sulfides, lithium molybdenum oxides, lithium vanadium oxides, lithium chromium oxides, lithium titanium oxides, lithium tungsten oxides, lithium cobalt oxides, lithium nickel oxides, and lithium manganese oxides (e.g., $LiMnO_2$ and $LiMn_2O_4$). In a particularly preferred embodiment of this invention, pure metal oxides (usually $LiCoO_2$, $LiNiO_2$, $LiMnO_2$ and/or $LiMn_2O_4$) are combined with one another in certain ratios, combined with a conductive additive, a suspension thickener, and a solvent with a dissolved polymer, to produce a superior high voltage cathode with improved charge/discharge characteristics. In especially preferred embodiments, the mixture includes either (i) $LiCoO_2$ and $LiNiO_2$ or (ii) $LiCoO_2$ and $LiMn_2O_4$ such that the $LiCoO_2$ constitutes about 10 to 90 percent by mass of the mixture. Such mixtures may be chosen based upon the cell anode such that they nearly identical formation and reversible cycling capacities. The advantages and details of this approach am spelled out in U.S. patent application Ser. No. 08/493,715 (Attorney Docket No. POLYP006) entitled "NONAQUEOUS ELECTROLYTE SECONDARY BATTERY", filed on Jun. 22, 1995, and now abandoned and naming S. Mayer as inventor. That application is incorporated herein by reference for all purposes.

An organic electrolyte for use in the cell may include any of various acceptable compounds and salts. Suitable organic electrolytes for use in intercalation cells include one or more of the following: propylene carbonate, ethylene carbonate, 1,2-dimethoxyethane, 1,2-diethoxyethane, γ-butyrolactone, tetrahydrofuran, 2-methyltetrahydrofuran, 1,3-dioxolan, 4-methyl 1,3-dioxolan, diethyl ether, sulfolane, acetonitrile, propionitrile, dimethyl carbonate, diethyl carbonate, anisole, methyl propionate, ethyl propionate, methyl acetate, normal-propyl acetate, iso-propyl acetate, normal-butyl acetate, ethyl methyl carbonate, and mixtures or combinations thereof. Suitable electrolyte salts include one or more of the following: lithium bistrifluoromethane sulfonimide (Li$(CF_3SO_2)_2$N available from 3M Corp. of Minnesota), LiAsF$_6$, LiPF$_6$, LiBF$_4$, LiB($C_6H_5$)$_4$, LiCl, LiBr, CH$_3$SO$_3$Li, and CF$_3$SO$_3$Li. In a preferred embodiment, the electrolyte includes a mixture of ethylene carbonate and dimethyl carbonate as the solvent together with Li(CF$_3$SO$_2$)$_2$N, and LiAsF$_6$ or LiPF$_6$. In a particularly preferred embodiment, the electrolyte includes a mixture of (1) ethylene carbonate and dimethyl carbonate as solvent, (2) dissolved Li(CF$_3$SO$_2$)$_2$N (about 0.5 to 1.2M), and (3) dissolved LiAsF$_6$ or LiPF$_6$ (either of which is present in a concentration of about 0.1 to 0.4M). The total concentration of Li(CF$_3$SO$_2$)$_2$N and LiAsF$_6$ or LiPF$_6$ should not exceed the solubility limit of lithium in the solvent. Thus, the total concentrations of these salts will generally be maintained below about 1.5M.

Various separators known and widely-used in the art may be employed in the cells of this invention. Two particularly preferred separator materials are Celgard 2400 and Celgard 2500 available from Hoechst Celanese of Dallas, Tex. These materials are thin and inert and resist puncture.

Although the foregoing invention has been described in some detail for purposes of clarity of understanding, it will be apparent that certain changes and modifications may be practiced within the scope of the appended claims. For instance, although the specification has primarily described cell cap subassemblies employing either a resilient member or a flip disk, other embodiments employing pressure contacts can be practiced within the scope of this invention. In addition, although the specification has described primarily lithium ion cells as the beneficiaries of the present invention, there is in principle no reason why the invention can not be employed in other cell types, particularly those employing liquid electrolytes. Still further, while the preferred embodiments have illustrated a pressure relief mechanism associated with a positive cell terminal (connected to a cathode on discharge), the same relief mechanism could be employed at a negative cell terminal. Therefore, the present embodiments are to be considered as illustrative and not restrictive, and the invention is not to be limited to the details given herein, but may be modified within the scope of the appended claims.

What is claimed is:

1. A cell cap subassembly for controlling pressure build-up in a cell, said cell cap subassembly comprising:
    a terminal contact for making electrical contact with an external circuit;
    a flip-burst disk having a substantially dome shaped flip portion and a rim portion connected to and located outside of said flip portion, said rim portion making electrical contact with said terminal contact, said flip portion protruding away from said terminal contact under a pressure that is below a first defined pressure, but at said first defined pressure inverting such that it protrudes toward said terminal contact, said flip-burst disk also having a pressure rupturable region that ruptures when the battery cell cap assembly is exposed to a second defined pressure which is greater than the first defined pressure; and
    a conductive pathway making electrical contact with said flip portion of said flip-burst disk, said conductive pathway providing at least a portion of a pathway for electrons between an electrode and a pressure sensitive contact, wherein when said battery cell cap assembly is exposed to at least said first defined pressure, said flip portion inverts and opens electrical contact with said conductive pathway.

2. The cell cap subassembly as recited in claim 1 further comprising a positive temperature coefficient resistor electrically connecting said terminal contact to said flip-burst disk, wherein said positive temperature coefficient resistor has a resistance which substantially increases at current densities greater than a predefined level.

3. The cell cap subassembly as recited in claim 2 wherein the positive temperature coefficient resistor includes a conductive polymeric material.

4. The cell cap subassembly as recited in claim 2 further comprising an insulating insert which engages at least a portion of the terminal contact and the flip-burst disk so as to maintain the terminal contact, the positive temperature coefficient resistor, and the flip-burst disk in electrical contact.

5. The cell cap subassembly as recited in claim 2, further comprising a subassembly jacket which forms part of the conductive pathway and holds said insulating insert in engagement with the terminal contact and the flip-burst disk.

6. The cell cap subassembly as recited in claim 1, wherein the flip portion of said flip-burst disk comprises aluminum.

7. The cell cap subassembly as recited in claim 6, wherein the thickness of the flip-burst disk is between about 50 and 250 micrometers.

8. The cell cap subassembly as recited in claim 7, wherein said pressure rupturable region comprises a region of reduced thickness in comparison to the remainder of the flip portion of said flip-burst disk.

9. The cell cap subassembly as recited in claim 8, wherein the region of reduced thickness is a scored region.

10. A cell cap subassembly for controlling pressure build-up in a cell, said cell cap subassembly comprising:
    a terminal contact for making electrical contact with an external circuit;
    a conductive deflection member in electrical contact with said terminal contact and including a pressure rupturable region; and
    a conductive pathway making a pressure contact with said conductive deflection member, said conductive pathway providing at least a portion of a pathway for electrons flowing between said pressure contact and an electrode, wherein said conductive deflection member deflects under a first defined pressure such that said pressure contact is opened and said pressure rupturable region ruptures under a second defined pressure which is greater than said first defined pressure.

11. The cell cap subassembly as recited in claim 10 further comprising a resilient member which is disposed between said terminal contact and said conductive deflection member such that said resilient member, under a pressure that is below said first defined pressure allows said conductive deflection member to make said pressure contact with said conductive pathway, wherein when said resilient member is under compression due to a cell internal pressure of at least said first defined pressure, the pressure contact between said conductive deflection member and said conductive pathway is opened.

12. The cell cap subassembly as recited in claim 11, wherein said resilient member comprises a rubber or elastomeric material.

13. The cell cap subassembly as recited in claim 10, wherein said conductive deflection member comprises a flip-burst disk having a substantially dome shaped flip portion and a rim portion connected to and located outside of said flip portion, said rim portion making electrical contact with said terminal contact, said flip portion protruding away from said terminal contact to make the pressure contact with said conductive pathway, and, at a first defined pressure, inverting such that it protrudes toward said terminal contact, wherein said flip portion has a pressure rupturable region which ruptures said flip portion at a second defined pressure which is greater than the first defined pressure.

14. The cell cap subassembly as recited in claim 10, wherein said pressure rupturable region comprises a region of reduced thickness in said conductive deflection member.

15. The cell cap subassembly as recited in claim 14, wherein the region of reduced thickness is a scored region.

16. A method for controlling pressure build-up in a cell, the method comprising the following steps:

provising a cell having a cell cap subassembly and a cell interior, the cell cap subassembly including a flip-burst disk having a substantially dome shaped flip portion in electrical communication with a terminal contact, said flip portion being provided in a position in which it protrudes away from said terminal contact under a pressure that is below a first defined pressure and provides contact to an electrical pathway to an electrode in the cell, said flip portion also having an inverted position in which it protrudes toward said terminal contact and does not make contact with said electrical pathway, and said flip portion also having a pressure rupturable region;

inverting said flip portion when exposed to said first defined pressure in the cell, whereby electrical contact is opened between said electrode and said cell terminal contact; and rupturing said flip portion at said pressure rupturable region when exposed to a second defined pressure in the cell which is greater than said first defined pressure, whereby a fluid pathway is provided from the cell interior to the cell exterior when the flip portion breaks.

17. The method of claim 16, wherein said first defined pressure is caused by a continuous electrochemical reaction within the cell.

18. The method of claim 17, wherein said step of inverting the flip portion discontinues said electrochemical reaction.

19. A lithium ion cell comprising:

(a) a cell container having a cell cap subassembly including
  (i) a terminal contact for making electrical contact with an external circuit,
  (ii) a conductive deflection member in electrical contact with said terminal contact and including a pressure rupturable region, and
  (iii) a conductive pathway making a pressure contact with said conductive deflection member, said conductive pathway providing at least a portion of a pathway for electrons flowing between said pressure contact and an electrode, wherein said conductive deflection member deflects under a first defined pressure such that said pressure contact is opened and pressure rupturable region ruptures under a second defined pressure which is greater than said first defined pressure;

(b) an anode provided within the cell container and capable of intercalating lithium during charge and deintercalating lithium during discharge, the anode including a specified anode material;

(c) a cathode provided within the cell container and capable of taking up lithium on discharge and releasing lithium on charge, the cathode including a specified cathode material; and (d) an electrolyte conductive to lithium ions and provided within said cell container.

20. The lithium ion cell of claim 19 further comprising a resilient member which is disposed between said terminal contact and said conductive deflection member such that said resilient member in a normal position allows said conductive deflection member to make said pressure contact with said conductive pathway, wherein when said resilient member is under compression due to a pressure of at least said first defined pressure, the pressure contact between said conductive deflection member and said conductive pathway is opened.

21. The lithium ion cell of claim 19 wherein said conductive deflection member comprises a flip-burst disk having a substantially dome shaped flip portion and a rim portion connected to and located outside of said flip portion, said rim portion making electrical contact with said terminal contact, said flip portion protruding away from said terminal contact to make said pressure contact with said conductive pathway, and, at a first defined pressure, inverting such that it protrudes toward said terminal contact.

22. The lithium ion cell of claim 19 wherein the mixture of two or more homogeneous lithium ion insertion materials, wherein the specified cathode material includes a mixture of two or more homogeneous lithium ion insertion materials characterized by two ratios, a first ratio which is the ratio between the per mass capacities of said mixture and said specified anode material required to reversibly charge and discharge said lithium ion cell, and a second ratio which is the ratio between the per mass capacities of said mixture and said specified anode material required to put the lithium ion cell through formation, and wherein relative amounts of the two or more homogeneous lithium ion insertion materials in the mixture are chosen such that the first and second ratios are substantially the same.

23. The lithium ion cell of claim 22 wherein the two or more homogeneous lithium ion insertion materials are $LiCoO_2$ and $LiNiO_2$ or are $LiCoO_2$ and $LiMn_2O_4$.

24. The lithium ion cell of claim 19 wherein the anode includes a mixture of homogeneous graphitic carbon particles and homogeneous non-graphitic carbon particles.

25. The lithium ion cell of claim 19 wherein the electrolyte includes one or more of the following: propylene carbonate, ethylene carbonate, 1,2-dimethoxyethane, 1,2-diethoxyethane, γ-butyrolactone, tetrahydrofuran, 2-methyltetrahydrofuran, 1,3-dioxolan, 4-methyl 1,3-dioxolan, diethyl ether, sulfolane, acetonitrile, propionitrile, glutaronitrile, dimethyl carbonate, diethyl carbonate, anisole, methyl propionate, ethyl propionate, methyl acetate, normal-propyl acetate, iso-propyl acetate, normal-butyl acetate, ethyl methyl carbonate, and mixtures thereof.

26. The lithium ion cell of claim 25 wherein the electrolyte further includes one or more of the following salts: $LiN(CF_3SO_2)_2$, $LiAsF_6$, $LiPF_6$, $LiBF_4$, $LiB(C_6H_5)_4$, $LiCl$, $LiBr$, $CH_3SO_3Li$, and $CF_3SO_3Li$.

27. The lithium ion cell of claim 26 wherein the electrolyte includes a mixture of ethylene carbonate and dimethyl carbonate and dissolved $LiN(CF_3SO_2)_2$ at about 0.5 to 1.2M and dissolved $LiAsF_6$ or $LiPF_6$ at about 0.1 to 0.4M, wherein the total concentration of $Li(CF_3SO_2)_2N$ and $LiAsF_6$ or $LiPF_6$ does not exceed the solubility limit of lithium in the solvent.

* * * * *